United States Patent [19]

Scholl et al.

[11] Patent Number: 5,260,129
[45] Date of Patent: Nov. 9, 1993

[54] POLYETHER/POLYCARBONATE BLOCK COPOLYMER COATINGS FOR PLASTIC MOLDINGS

[75] Inventors: Thomas Scholl, Meerbusch; Herbert Hugl, Bergisch Gladbach; Wolfgang Nising, St. Augustin, all of Fed. Rep. of Germany

[73] Assignee: Bayer Aktiengesellschaft, Leverkusen, Fed. Rep. of Germany

[21] Appl. No.: 816,312

[22] Filed: Dec. 30, 1991

[30] Foreign Application Priority Data

Jan. 4, 1991 [DE] Fed. Rep. of Germany ....... 4100119

[51] Int. Cl.$^5$ .................. B32B 27/36; C08L 69/00
[52] U.S. Cl. .................... 428/336; 428/412; 428/913; 525/469; 528/196; 528/204
[58] Field of Search .............. 428/412, 336, 913; 528/196, 204; 525/469

[56] References Cited

U.S. PATENT DOCUMENTS

| | | | |
|---|---|---|---|
| 3,582,398 | 6/1971 | Ringler | 117/33.3 |
| 3,635,756 | 1/1972 | Shepherd et al. | 117/124 D |
| 3,738,956 | 6/1973 | Glatti et al. | 260/41 R |
| 3,865,619 | 2/1975 | Pennewiss et al. | 117/138.8 |
| 4,069,151 | 1/1978 | Higley et al. | 128/214 R |
| 4,075,108 | 2/1978 | Higley et al. | 210/500 M |
| 4,160,791 | 7/1979 | Higley et al. | 525/469 |
| 4,169,866 | 10/1979 | von Bonin et al. | 525/131 |
| 4,576,864 | 3/1986 | Krautter et al. | 428/328 |
| 4,607,070 | 8/1986 | Schreckenberg et al. | 524/100 |
| 4,634,743 | 1/1987 | Prier | 525/462 |
| 4,735,721 | 4/1988 | Schrenckenberg et al. | 210/500 |

FOREIGN PATENT DOCUMENTS 1395530 5/1975 United Kingdom .

*Primary Examiner*—P. C. Sluby
*Attorney, Agent, or Firm*—Joseph C. Gil; Aron Preis

[57] ABSTRACT

An article of manufacture having a hydrophilic coating is disclosed. To the article which may be made of a thermoplastic or from a thermoset resin there is applied a coating which comprise a segmented, aliphatic-aromatic polyether block copolycarbonates containing aromatic carbonate structural units and aliphatic polyether carbonate structural units. The coating may contain a surfactant.

6 Claims, No Drawings

POLYETHER/POLYCARBONATE BLOCK COPOLYMER COATINGS FOR PLASTIC MOLDINGS

FIELD OF THE INVENTION

The invention relates to polyether/polycarbonate block copolymers and more particularly to their use as coatings for plastic moldings.

SUMMARY OF THE INVENTION

An article of manufacture having a hydrophilic coating is disclosed. To the article which may be made of a thermoplastic or from a thermoset resin there is applied a coating which comprise a segmented, aliphatic-aromatic polyether block copolycarbonates containing aromatic carbonate structural units and aliphatic polyether carbonate structural units. The coating may contain a surfactant.

BACKGROUND OF THE INVENTION

DE-OSS 1,928,409 and 2,161,645 describe coatings of polymers of alkyl esters, hydroxyalkyl esters, methylol ethers of methacrylamide and, optionally, quaternary aminoalkyl esters of acrylic or methacrylic acid. However, the coatings are too sensitive to mechanical stressing and swell on wetting, so that they lose their adhesion to the substrate.

DE-PS 2,017,002 describes plastics containing small quantities of a surfactant, for example polyglycols. In this case, the effects obtained are too weak for practical application. The addition of the surfactant results in swelling of the plastic in water and, hence, in premature degradation on weathering.

U.S. Pat. No. 4,576,864 describes two-layer water-spreading coatings of which the lower layer is a hydrophobic polymer while the upper layer is formed from colloidal silica. The disadvantage of these coatings lies in the relatively complicated application of two layers which can be avoided by the coatings according to the present invention.

In addition, the coatings according to the present invention consist of thermoplastic material so that they may be applied by co-extrusion.

Finally, it is known from DE-OS 1,694,273 that the optical properties of thermoplastic moldings can be improved by coatings, the thermoplastic moldings consisting of polyacrylate or polycarbonate and the plastics suitable for coating consisting of polyacrylate or cellulose acetobutyrate for the polyacrylates and of polycarbonate, polyacrylate, cellulose acetobutyrate or polystyrene for the polycarbonates. The problem of spreading water is not discussed in DE-OS 1,694,273.

The segmented, aliphatic-aromatic polyether copolycarbonates are known (see, for example, DE-OS 2,251,066, U.S. Pat Nos. 4,160,791, 4,075,108, 4,069,151).

They may be obtained from diphenols H—D—OH (III), polyether diphenol carbonates

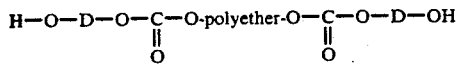

and phosgene in known manner by the interfacial method (see, for example, DE-OS 3,408,804).

DETAILED DESCRIPTION OF THE INVENTION

This invention relates to the use of polyether/polycarbonate block copolymers, optionally in combination with up to 30% by weight, based on the weight of block copolymer, of surfactants as coatings for plastic moldings, more particularly for moldings of thermoplastics or thermosets.

In the context of the invention, moldings of thermosets are understood to be only those which have been cured.

Polyether/polycarbonate block copolymers in the context of the invention are segmented, aliphatic-aromatic polyether copolycarbonates having weight average molecular weights (Mw) in the range from 20,000 to 350,000 and preferably in the range from 100,000 to 250,000 (as determined by the light scattering method using a scattered light photometer) and containing 30% by weight to 95% by weight aromatic carbonate structural units corresponding to formula (I)

in which
—D— is a diphenolate moiety containing 6 to 30 carbon atoms and preferably 12 to 24 carbon atoms,
and 70% by weight to 5% by weight aliphatic polyether carbonate structural units corresponding to formula (II)

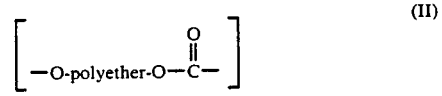

in which —O—polyether—O— is an aliphatic polyether diol moiety having a number average molecular weight, Mn, value of 600 to 20,000 and preferably 4,000 to 10,000, and in which up to about 8% by weight and preferably up to about 4% by weight, of the diphenolate moieties —D— may be replaced by $C_{2-15}$ alkylene diolate moieties and/or $C_{5-6}$ cycloalkylene diolate moieties and/or up to about 20 mol-% and preferably up to about 10 mol-%, of the carbonate moieties

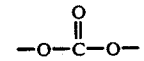

may be replaced by terephthalate and/or isophthalate and/or up to about 10 mol-% and preferably up to about 5 mol-%, of the carbonate moieties

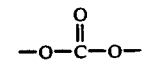

may be replaced by $C_{2-15}$ alkylene dicarboxylate moieties and/or $C_{5-6}$ cycloalkylene dicarboxylate moieties.

The segmented, aliphatic-aromatic polyether copolycarbonates are known (see, for example, DE-OS 2,251,066, U.S. Pat No. 4,160,791, 4,075,108, 4,069,151).

They may be obtained from diphenols H—D—OH (III), polyether diphenol carbonates

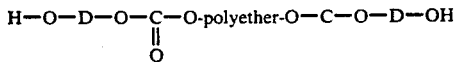

and phosgene in known manner by the interfacial method (see, for example, DE-OS 3,408,804).

The corresponding part of the diphenols HO—D—OH may be replaced by the $C_{2-15}$ alkylene diols or the $C_{5-6}$ cycloalkylene diols in the form of their bis-chlorocarbonic acid esters. Similarly, a corresponding part of the phosgene may be replaced by terephthalic acid dichloride, isophthalic acid dichloride, the $C_{2-15}$ alkane dicarboxylic acid dichlorides or $C_{5-6}$ cycloalkane dicarboxylic acid.

To regulate the molecular weights of the segmented aliphatic-aromatic polyether copolycarbonates, monophenols or aromatic monocarboxylic acid chlorides may be used in known manner in the usual quantities.

The polyether copolycarbonates may be linear or branched in known manner, for example by incorporation of triphenols.

Diphenols (III) suitable for the purposes of the invention are, for example, bis-(hydroxyphenyl)-alkanes, bis-(hydroxyphenyl)-cycloalkanes and dicycloalkanes, dihydroxydiphenyls, bis-(hydroxyphenyl)-ethers, bis-(hydroxyphenyl)-sulfones, bis-(hydroxyphenyl)-sulfides, bis(hydroxyphenyl)-ketones, α,α-bis-(hydroxyphenyl)-diisopropyl benzenes and nucleus-alkylated compounds thereof.

Preferred diphenols (III) are those corresponding to formula (IV)

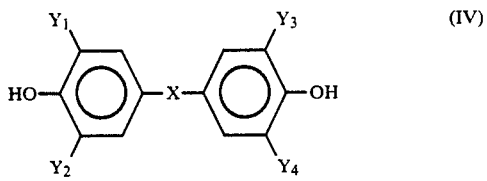

in which
X is a single bond, methylene, isopropylidene, cyclohexylidene, oxygen, sulfur, sulfone or carbonyl,
$Y_1$ to $Y_4$ may be the same or different and represent hydrogen or $C_{1-4}$ alkyl, preferably H or methyl.

Examples of diphenols (III) are 4,4'-dihydroxydiphenyl, 2,4'-dihydroxydiphenyl, 4,4'-dihydroxy-3,3',5,5'-tetramethyldiphenyl, 4,4'-dihydroxy-3,3'-dimethyldiphenyl, bis-(4-hydroxyphenyl)-methane, bis-(4-hydroxy-3,5-dimethyl-phenyl)-methane, bis-(4-hydroxyphenyl)-ethane, 2,2-bis-(4-hydroxyphenyl)-propane ("bisphenol A"), 2,2-bis-(4-hydroxy-3,5-dimethylphenyl)-propane, 2,2-bis-(4-hydroxy-3-methyl-phenyl)-propane, 1,1-bis-(4-hydroxyphenyl)-cyclohexane, 1,1-bis-(4-hydroxy-3,5-dimethylphenyl)-cyclohexane, bis-(4-hydroxyphenyl)-oxide, bis-(4-hydroxy-3,5-dimethylphenyl)-oxide, bis-(4-hydroxyphenyl)-ketone, bis-(4-hydroxy-3,5-dimethylphenyl)-ketone, bis-(4-hydroxy-3,3'-diethylphenyl)-propane, bis-(4-hydroxyphenyl)-sulfone, bis-(4-hydroxy-3,3'-dimethylphenyl)-sulfone, bis-(4-hydroxyphenyl)-sulfide and bis-(4-hydroxy-3,5-dimethylphenyl)-sulfide.

Particularly preferred diphenols (III) are 2,2-bis-(4-hydroxyphenyl)-propane and 2,2-bis-(4-hydroxy-3,5-dimethylphenyl)-propane.

Aliphatic polyether diols suitable for the production of the polyether diphenol carbonates are, preferably, polyethylene glycols, such as those available from Union Carbide (Carbowax) British Petrol (Breox) Hoechst (Polyglycol) and Hüls (Polywachs) having molecular weights (number average molecular weights) in the range from 600 to 20,000 and preferably in the range from 4,000 to 10,000. In addition to the polyethylene glycols mentioned, other hydroxyfunctional polyethers, for example polyethylene oxide/propylene oxide mixed polyethers and block polyethers, may also be used.

$C_{2-15}$ alkylene diols are, for example, ethylene glycol, Propane-1,2-diol, butane-1,4-diol, hexane-1,6-diol, octane-1,8-diol, dodecane-1,12-diol and 1,2-dihydroxydodecane; a $C_{5-6}$ cycloalkylene diol is, for example, 1,4-dihydroxy cyclohexane; $C_{2-15}$ alkane dicarboxylic acid dichlorides are, for example, succinic acid chloride, adipic acid dichloride, azelaic acid dichloride, sebacic acid dichloride and dodecane dicarboxylic acid dichloride; $C_{5-6}$ cycloalkane dicarboxylic acid dichlorides are, for example, hexahydroterephthaloyl chloride and hexahydroisophthaloyl chloride.

Suitable phenolic chain terminators are any of the usual phenols, such as phenol itself, p-tert.-butyl phenol and p-di-tert.-octyl phenol, and also monofunctional polyethers, while suitable aromatic monocarboxylic acid chlorides are benzoic acid chloride and alkyl benzoic acid chloride.

Preferred ratios of carbonate structural units (I) to polyether carbonate structural units (II) are 30% by weight to 55% by weight (I) to 70% by weight to 45% by weight (II) because ratios such as these enable the water spreading effect even without addition of surfactants.

The polyether carbonates to be used in accordance with the invention with Mw values of 20,000 to 350,000 and preferably in the range from 100,000 to 250,000 have relative solution viscosities (as measured on solutions of 0.5 g in 100 ml methylene chloride at 25° C.) in the range from 1.1 to 3.8 and preferably in the range from 1.5 to 3.8.

The molecular weights Mn (number average) of the polyether diols are determined by gel permeation chromatography and the hydroxyl number.

The coatings according to the invention for the plastics moldings should have a thickness of 0.001 μm to 20 μm and may be applied from solvents, from aqueous dispersions or, in the coating of moldings of thermoplastics, by coextrusion.

Accordingly, the present invention also relates to coated moldings of plastics, particularly thermoplastics or thermosets, which are characterized in that they are surface-coated with a 0.001 μm to 20 μm thick layer of polyether/polycarbonate block copolymer optionally containing up to 30% by weight, based on the weight of the block copolymer, of a surfactant.

This coating gives the plastic moldings a water-spreading surface.

Water-spreading surfaces are generally distinguished by the fact that, on contact with water, they do not form droplets of water on the surface, but instead a thin film of water which, in contrast to droplets of water, barely affects the optical properties of the molding, including for example light scattering, transmission, birefringence, etc. This affords advantages in the production of high-quality optical parts of plastics, such as spectacle lenses, visors, ski goggles, glazing for swimming baths and greenhouses. Accordingly, there has been no shortage of attempts to develop water-spreading coatings such as these for plastics.

In all those cases where the percentage content of polyether in the block copolymer layer is only from 5 to 45% by weight, based on the weight of the block copolymer, combination with surfactants is necessary. Surfactants in the context of the present invention are surface-active compounds and are intended to include protective colloids, dispersants, etc. Examples of such surfactants are polyalkylene oxides, alkyl and aryl sulfonates, quaternary ammonium salts, alkyl, aryl or ether sulfates, polyvinyl alcohols, partly hydrolyzed polyvinyl acetates, polyvinyl pyrrolidone, olefin/maleic anhydride copolymers, phenol sulfonic acid/formaldehyde condensates, naphthalene sulfonic acid/formaldehyde condensates and alkoxylated phenol/formaldehyde condensates.

Surface-active compounds such as these are known from the literature and are commercially available. More detailed descriptions, including suppliers, can be found, for example, in Stache, "Tensid-Taschenbuch", Carl Hanser Verlag, Munchen/Wien.

Particularly preferred surfactants are ionic surfactants, such as dodecyl benzene sulfonic acid, polystyrene sulfonic acid, di-i-octyl phosphoric acid and salts thereof and quaternary ammonium compounds, such as dodecyl benzyl ammonium chloride, etc.

Although the surfactant may be added in very large quantities, overdosage will result in most of the surfactant gradually being washed out by contact with water.

As already mentioned, suitable quantities of surfactant are between 0% by weight and 30% by weight, based on the weight of the polyether/polycarbonate coating. The quantity of surfactant is determined primarily by the percentage by weight of carbonate structural units (I) in the coating and by the percentage by weight of polyether structural unit (II) in the coating.

In addition, the coating may contain stabilizers against thermal, photochemical or oxidative degradation, including for example phenolic antioxidants, phosphites, hydroxybenzophenones, hydroxyphenyl benztriazoles, salicylates, oxanilides, sterically hindered amines, etc. Antioxidants such as these are commercially available and are described, for example, in Gächter, Müller, "Kunststoff-Additive", Hanser-Verlag, München/Wien, 1989, pages 1–272.

Accordingly, the present invention also relates to the use of the polyether/polycarbonate block copolymers in combination with stabilizers and optionally in combination with surfactants as coatings for plastic moldings.

Accordingly, the present invention also relates to the plastic moldings coated in accordance with the invention, characterized in that the layer of polyether/polycarbonate block copolymers additionally contains stabilizers and, optionally, surfactants.

As already mentioned, the water-spreading coatings according to the invention may be applied, for example, by known methods from an organic solution. Examples of suitable solvents include, 1,3-dioxolane, 1,3-dioxane, 1,4-dioxane, tetrahydrofuran, y-butyrolactone, acetonitrile, dimethyl formamide, methylene chloride, chloroform, chlorobenzene or mixtures of these solvents.

Preferred layer thicknesses are from 0.1 μm to 5 μm.

The present invention also relates to a process for the production of the coated plastic moldings, more particularly of thermoplastics or thermosets, characterized in that they are coated with a solution of polyether/polycarbonate block copolymers and, optionally, surfactants and/or stabilizers and the solvent is evaporated in known manner.

As already mentioned, the hydrophilic coatings according to the invention may be applied not only from solvents, but also by coextrusion by virtue of their thermoplastic properties. Particularly suitable moldings for this method of coating art, for example, window plates or double-walled sheets according to EP-OS 54,856. In their case, the film is preferably applied in a thickness of 1 to 20 μm.

Accordingly, the present invention also relates to a process for the production of the coated moldings of thermoplastics, characterized in that, during their production, the moldings of thermoplastics are coated with the polyether/polycarbonate copolymers by coextrusion at temperatures in the range from 220° to 320° C.

Suitable plastics to be treated with the coatings according to the invention are, for example, thermoplastics, such as aromatic polycarbonates (cf. U.S. Pat. No. 3,028,365, 3,062,781 and 3,879,347), aromatic polyesters and polyester carbonates (see DE-OSS 1,495,626, 2,232,877, 2,703,376, 3,000,610, 2,714,544 and 3,000,934), thermoplastic $C_{1-4}$ polyalkyl methacrylates, thermoplastic polystyrenes and polyvinyl chlorides, or thermosets, for example of allyl or diallyl carbonates (see DE-OS 3,439,935) or (meth)acrylates (see GB-PS 2,076,836) or unsaturated polyester resins.

Any moldings of plastics, more particularly thermoplastics or thermosets, are suitable for coating in accordance with the invention. Examples of such moldings are double-walled sheets and solid sheets of thermoplastics (PC, PHMA, PS, PVC) for glazing, more particularly in greenhouse construction sunglasses visors for motorcycle helmets, etc.

The moldings may be produced by any of the methods known to the expert on plastics. In the case of thermoplastics, the moldings are mainly produced by extrusion or injection molding; in the case of thermosets, the moldings are mainly produced by casting or press molding and subsequent curing.

The invention is further illustrated but is not intended to be limited by the following examples in which all parts and percentages are by weight unless otherwise specified.

EXAMPLE 1

A polyether copolycarbonate is produced from 20 parts by weight polyethylene oxide (Mn 8000) 80 parts by weight bisphenol A and phosgene (excess) by the method according to DE-OS 3,408,804. To this end, the bisphenol A, the polyether and the sodium hydroxide are introduced into a mixture of methylene chloride and water and the phosgene is then introduced in an excess of 150 mol-%, based on bisphenol A. At the same time, sodium hydroxide is introduced in such a quantity that a constant pH value of 14 is maintained.

The polyether copolycarbonate obtained has a relative viscosity (as measured on a solution of 0.5 g polymer in 100 ml methylene chloride at 25° C.) of 2.41; Mw (as measured by gel permeation chromatography) 130,000.

EXAMPLE 2

A polyether copolycarbonate is produced from 55 parts by weight polyethylene oxide (Mn 8,000) 45 parts by weight bisphenol A and phosgene (excess) by the method according to DE-OS 3,408,804. The procedure adopted corresponds to Example 1 above.

The polyether copolycarbonate obtained has a relative viscosity (as measured in Example 1 above) of 2.82; Mw (as measured in Example 1 above) 160,000.

EXAMPLE 3

1.0 g of the polyether polycarbonate of Example 1 and 0.2 g dodecyl benzene sulfonic acid Na salt are dissolved in 100 g 1,3-dioxolane and the resulting solution is subsequently filtered. The clear solution is applied by a hand coating knife (gap width 50 μm) to a polycarbonate sheet and dried for 10 minutes at 70° C.

EXAMPLE 4

1.0 g of the polyether carbonate of Example 2 are dissolved in 100 g 1,3-dioxolane and, after filtration, the resulting solution is applied by a hand coating knife (gap width 50 μm) to a polycarbonate sheet, followed by drying for 10 minutes at 70° C.

EXAMPLE 5

Wetting behavior

The coated plastic sheets of Examples 3 and 4 are immersed in water. After removal, a thin film of water is spontaneously formed (in contrast to an uncoated sheet) By contrast, droplets of water remain behind on the uncoated sheets.

EXAMPLE 6

Hydrolysis stability

After storage in water for 4 weeks at room temperature, the coated plastics of Examples 3 and 4 still show the same water-spreading effect.

EXAMPLE 7 (COMPARISON EXAMPLE)

In accordance with DE-OS 2,017,002, a solution of 2.5 g polycarbonate based on bisphenol A, Mw approx. 28,000, 0.125 g polyether of oleyl alcohol and 50 mol ethylene oxide in 100 g methylene chloride is applied by a hand coating knife (gap width 50 μm) to a polycarbonate sheet and dried for 10 minutes at 40° C.

The coated sheet is immersed in water. After removal, droplets of water are immediately formed both on the coated side and on the uncoated side.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An article of manufacture having a hydrophilic coating 0.001 to 20 μm thick said article being molded of a plastic resin and said coating comprising a segmented, aliphatic-aromatic polyether block copolycarbonates having weight average molecular weight of 20,000 to 350,000, as determined by the light scattering, containing 30% by weight to 95% by weight aromatic carbonate structural units corresponding to formula (I)

in which
—D— is a diphenolate moiety containing 6 to 30 carbon atoms, and 70% by weight to 5% by weight aliphatic polyether carbonate structural units corresponding to formula (II)

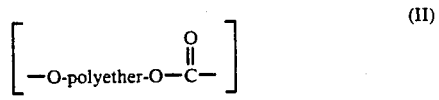

in which —O—polyether—O— is an aliphatic polyether diol moiety having a number average molecular weight of 600 to 20,000.

2. The article of claim 1 wherein said coating further comprise a surfactant in an amount of up to 30 percent relative to the weight of said block copolycarbonate.

3. The article of claim 2 wherein coating further contains a stabilizer against thermal, photochemical or oxidative degradation.

4. The article of claim 1 wherein said plastic is a thermoplastic resin.

5. The article of claim I wherein said plastic is a thermoset resin.

6. The article of claim 1 wherein coating further contains a stabilizer against thermal, photochemical or oxidative degradation.